United States Patent
Baek et al.

(10) Patent No.: US 11,343,302 B2
(45) Date of Patent: May 24, 2022

(54) METHOD FOR CONTROLLING BITRATE IN REALTIME AND ELECTRONIC DEVICE THEREOF

(71) Applicant: SAMSUNG ELECTRONICS CO., LTD., Suwon-si (KR)

(72) Inventors: Junga Baek, Suwon-si (KR); Yongtae Kim, Suwon-si (KR); Dukju Ko, Suwon-si (KR); Namkyeom Kim, Suwon-si (KR); Jeongwun Jee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 16/739,587

(22) Filed: Jan. 10, 2020

(65) Prior Publication Data

US 2020/0267200 A1  Aug. 20, 2020

(30) Foreign Application Priority Data

Feb. 18, 2019 (KR) .................. 10-2019-0018613

(51) Int. Cl.
*H04L 65/80* (2022.01)
*H04L 65/1096* (2022.01)
(Continued)

(52) U.S. Cl.
CPC .......... *H04L 65/80* (2013.01); *H04L 65/1096* (2013.01); *H04L 65/607* (2013.01); *H04M 7/0081* (2013.01)

(58) Field of Classification Search
None
See application file for complete search history.

(56) References Cited

U.S. PATENT DOCUMENTS 7,411,901 B1    8/2008  Alexander et al.
7,643,414 B1 *  1/2010  Minhazuddin .......... H04L 47/70
                                                370/230

(Continued)

FOREIGN PATENT DOCUMENTS

KR     10-0282553     2/2001

OTHER PUBLICATIONS

International Search Report dated May 8, 2020, in corresponding International Patent Application No. PCT/KR2020/001004.
(Continued)

*Primary Examiner* — Dhairya A Patel
(74) *Attorney, Agent, or Firm* — Nixon & Vanderhye P.C.

(57) ABSTRACT

Disclosed is an electronic device including a sound receiving circuit, a communication circuit, a processor, and a memory. The memory may store one or more instructions that, when executed, cause the processor to control the electronic device to: make a packet based call with an external electronic device using the communication circuit, to obtain communication environment information of the electronic device, to determine a change in a bitrate of the packet based call based on the obtained communication environment information, to identify whether a voice is received through the sound receiving circuit, and to change the bitrate of the packet based call from a first bitrate to a second bitrate based on a silent section in which the voice is not received through the sound receiving circuit being identified.

17 Claims, 6 Drawing Sheets

(51) Int. Cl.
*H04L 65/60* (2022.01)
*H04M 7/00* (2006.01)

(56) References Cited

U.S. PATENT DOCUMENTS

| | | |
|---|---|---|
| 8,509,108 B2 | 8/2013 | Koo |
| 9,009,341 B2* | 4/2015 | Edholm .............. H04L 65/1083 |
| | | 709/231 |
| 9,253,238 B2* | 2/2016 | Khay-Ibbat ....... H04W 28/0236 |
| 9,319,289 B2 | 4/2016 | Macinnis et al. |
| 9,961,007 B2 | 5/2018 | Khay-Ibbat et al. |
| 2009/0177465 A1* | 7/2009 | Johansson ................ G10L 19/24 |
| | | 704/219 |
| 2011/0103468 A1* | 5/2011 | Polisetty ........ H04N 21/234363 |
| | | 375/240.03 |
| 2011/0216663 A1* | 9/2011 | Koo .......................... H04J 3/14 |
| | | 370/252 |
| 2013/0163446 A1* | 6/2013 | Kruger .................... H04L 43/12 |
| | | 370/252 |
| 2013/0268265 A1 | 10/2013 | Jeong et al. |
| 2013/0329595 A1* | 12/2013 | Scholz .................... H04L 65/80 |
| | | 370/252 |
| 2014/0219132 A1* | 8/2014 | Delveaux ............ H04L 12/4035 |
| | | 370/254 |
| 2014/0344443 A1 | 11/2014 | Macinnis et al. |
| 2015/0092575 A1* | 4/2015 | Khay-Ibbat ............. H04L 65/80 |
| | | 370/252 |
| 2015/0223110 A1* | 8/2015 | Lindner .................. H04W 4/08 |
| | | 455/518 |
| 2016/0165059 A1* | 6/2016 | Deng ................ H04W 28/0215 |
| | | 370/252 |
| 2016/0165060 A1* | 6/2016 | Li ....................... H04M 7/0072 |
| | | 370/259 |
| 2016/0255348 A1 | 9/2016 | Panchagnula et al. |
| 2018/0013896 A1 | 1/2018 | Li et al. |
| 2018/0302515 A1 | 10/2018 | Li et al. |
| 2018/0324613 A1* | 11/2018 | Faronius ............ H04L 65/1059 |

OTHER PUBLICATIONS

Extended European Search Report dated Jun. 18, 2020, in corresponding European Patent Application No. 20157951.3.

* cited by examiner

METHOD FOR CONTROLLING BITRATE IN REALTIME AND ELECTRONIC DEVICE THEREOF

CROSS-REFERENCE TO RELATED APPLICATION

This application is based on and claims priority under 35 U.S.C. § 119 to Korean Patent Application No. 10-2019-0018163, filed on Feb. 18, 2019, in the Korean Intellectual Property Office, the disclosure of which is incorporated by reference herein its entirety.

BACKGROUND

1. Field

The disclosure relates to a method for controlling a bitrate in real time and an electronic device thereof.

2. Description of Related Art

A voice call over a packet switched (PS) network is used to improve the voice quality and efficiency of a voice call over a circuit switched (CS) network. For example, Internet protocol (IP)-based voice over IP (VoIP) technology may be used. In the VoIP technology, a voice and/or a video may be exchanged through data packets. The VoIP technology may be applied to various packet data network-based network platforms.

The electronic device may be configured to encode the voice and/or image of a user and to transmit a packet including the generated voice and/or image data. For example, an electronic device may encode a voice and/or an image using codec.

An electronic device may support various codecs. For example, the codecs may differ in an encoding method, a codec standard, a bandwidth, and/or a bitrate from one another. The electronic device may negotiate parameters (e.g., encoding methods, resolutions, frame per second (FPS) codec standards, bandwidths, and/or bitrates) of codec (e.g., voice codec and/or video codec) at the beginning of an incoming call or outgoing call, with a network. For example, the network may set parameters associated with the codec of the electronic device based on data traffic of the network.

The above information is presented as background information only to assist with an understanding of the disclosure. No determination has been made, and no assertion is made, as to whether any of the above might be applicable as prior art with regard to the disclosure.

SUMMARY

Embodiments of the disclosure address at least the above-mentioned problems and/or disadvantages and to provide at least the advantages described below.

In accordance with an example aspect of the disclosure, an electronic device may include a sound receiving circuit, a communication circuit, a processor operatively connected to the sound receiving circuit and the communication circuit, and a memory operatively connected to the processor. The memory may store one or more instructions that, when executed, cause the processor to control the electronic device to: make a packet based call with an external electronic device using the communication circuit, to obtain communication environment information of the electronic device using the communication circuit, to determine a change in a bitrate of the packet based call based on the obtained communication environment information, to identify whether a voice is received through the sound receiving circuit in response to the determination of the change in the bitrate, and to change the bitrate of the packet based call from a first bitrate to a second bitrate based on a silent section in which the voice is not received through the sound receiving circuit being identified.

In accordance with another example aspect of the disclosure, a method for changing a bitrate during a voice call of an electronic device may include making a packet based call with an external electronic device, obtaining communication environment information of the electronic device, determining a change in a bitrate of the packet based call based on the obtained communication environment information, identifying whether a voice is received in response to the determination of the change in the bitrate, and changing the bitrate of the packet based call from a first bitrate to a second bitrate based on a silent section in which the voice is not received being identified.

In accordance with another example aspect of the disclosure, an electronic device may include a sound receiving circuit, a communication circuit, a processor operatively connected to the sound receiving circuit and the communication circuit, and a memory operatively connected to the processor. The electronic device is configured to make a packet based call with an external electronic device using the communication circuit, the memory may store one or more instructions that, when executed, cause the processor to control the electronic device to: encode a sound signal received using the sound receiving circuit using a codec at a first bitrate to transmit the encoded sound signal to the external electronic device at a first period, to obtain communication environment information of the electronic device using the communication circuit, to determine a change in a bitrate of the packet based call based on the obtained communication environment information, to identify at least one silent section among a plurality of sound signal sections received through the sound receiving circuit and divided into units of the first period in response to the determination of the change in the bitrate, and to change the bitrate of the packet based call from the first bitrate to a second bitrate in the identified at least one silent section.

Other aspects, advantages, and salient features of the disclosure will become apparent to those skilled in the art from the following detailed description, which, taken in conjunction with the annexed drawings, discloses various example embodiments of the disclosure.

BRIEF DESCRIPTION OF THE DRAWINGS

The above and other aspects, features, and advantages of certain embodiments of the disclosure will be more apparent from the following detailed description, taken in conjunction with the accompanying drawings, in which.

DETAILED DESCRIPTION

Below, various example embodiments of the disclosure may be described with reference to accompanying drawings. The embodiments and terms used with regard to the various example embodiments are not intended to limit the scope of the disclosure, and should be understood to include various modifications, equivalents, and/or alternatives of the example embodiments.

Figure 1:
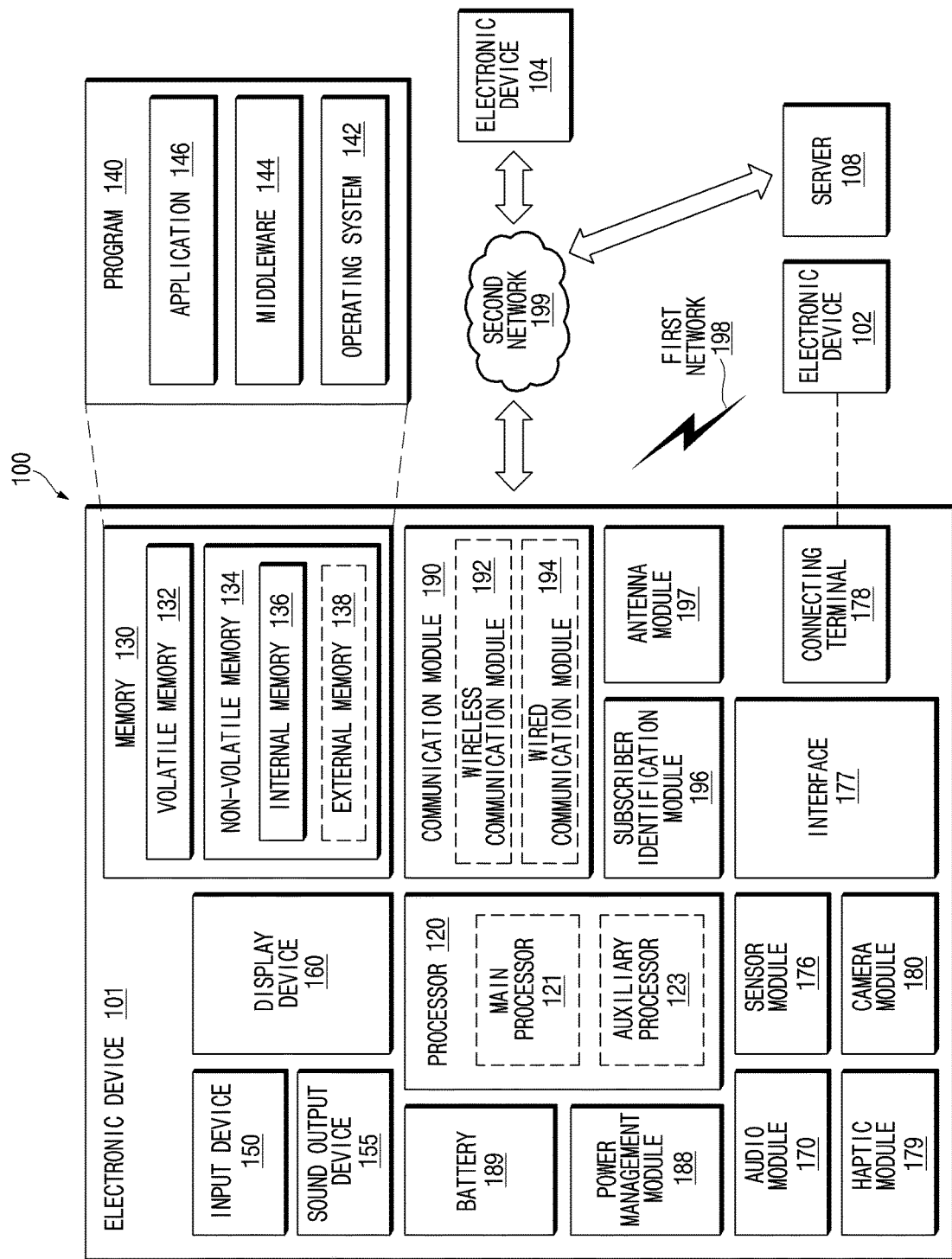
FIG. 1 is a block diagram illustrating an example electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly.

According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120, it will be understood that the processor may include multiple processors providing distributed processing and/or control) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory storage medium" may be a tangible device, and may not include a signal (e.g., an electromagnetic wave), but this term does not differentiate between where data is semi-permanently stored in the storage medium and where the data is temporarily stored in the storage medium. For example, "the non-transitory storage medium" may include a buffer where data is temporally stored.

According to an embodiment, a method according to various embodiments of the disclosure may be included and provided in a computer program product. The computer program product may be traded as a product between a seller and a buyer. The computer program product (e.g., downloadable app or application)) may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
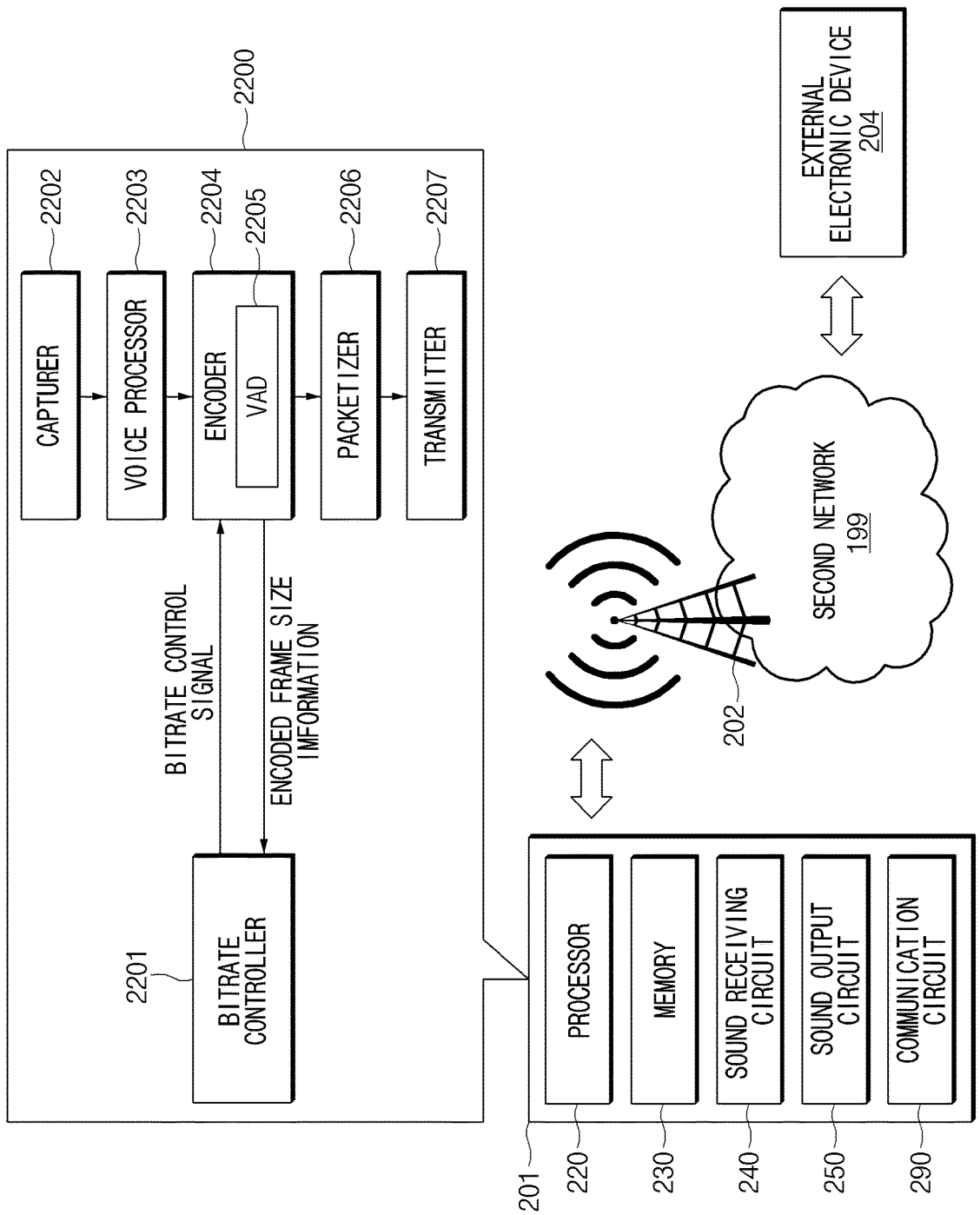
FIG. 2 is a diagram illustrating an example electronic device in a communication environment with an external electronic device, according to an embodiment.

FIG. 2 is a diagram illustrating an example electronic device 201 in a communication environment with an external electronic device 204, according to an embodiment.

According to an embodiment, the electronic device 201 (e.g., the electronic device 101 of FIG. 1) may include a processor (e.g., including processing circuitry) 220 (e.g., the processor 120 of FIG. 1 (e.g., an application processor) or a communication module 190 of FIG. 1 (e.g., a communication processor)), a memory 230 (e.g., the memory 130 of FIG. 1), a sound receiving circuit 240 (e.g., the input device 150 of FIG. 1), a sound output circuit 250 (e.g., the sound output device 155 of FIG. 1), and a communication circuit 290 (e.g., the communication module 190 of FIG. 1). The configuration of the electronic device 201 illustrated in FIG. 2 is merely an example, and embodiments of the disclosure are not limited thereto. For example, the electronic device 201 may not include at least one of the components illustrated in FIG. 2. For another example, the electronic device 201 may further include a configuration (e.g., a display) not illustrated in FIG. 2.

According to an embodiment, the processor 220 may be operatively connected to the memory 230, the sound receiving circuit 240, the sound output circuit 250, and the communication circuit 290. The processor 220 may include various processing circuitry and control the components of the electronic device 201 (e.g., the memory 230, the sound receiving circuit 240, the sound output circuit 250, and the communication circuit 290). For example, the processor 220 may control the the electronic device 201 and/or the components thereof depending on one or more instructions stored in the memory 230. According to an embodiment, the processor 220 may include an application processor and/or a communication processor.

According to an embodiment, the sound receiving circuit 240 may receive a sound. For example, the sound receiving circuit 240 may include a microphone for receiving a sound signal or may be connected to the microphone. The sound receiving circuit 240 may convert the received analog sound signal into a digital signal.

According to an embodiment, the sound output circuit 250 may output a sound. For example, the sound output circuit 250 may include at least one speaker for outputting a sound signal.

According to an embodiment, the communication circuit 290 may provide the electronic device 201 with communication with the external electronic device 204 over at least one network. For example, and without limitation, the communication circuit 290 may be configured to communicate with an external electronic device 204 via a base station 202 and the second network 199 (e.g., a cellular network). An embodiment is illustrated by way of non-limiting example in FIG. 2 as the communication circuit 290 provides the communication over the second network 199. However, embodiments of the disclosure are not limited thereto. For example, the communication circuit 290 may be configured to communicate with the external electronic device 204 over an Internet network connected to a short range wireless network (e.g., a WiFi network).

According to various embodiments, the electronic device 201 may be a device configured to make a call. According to an embodiment, the electronic device 201 may be configured to make a packet data based call. For example, the electronic device 201 may be configured to make a packet data based video call and/or voice call. According to an embodiment, the electronic device 201 may be configured to make a packet based call over a cellular network. For example, the electronic device 201 may be configured to make a voice over long-term evolution (VoLTE) based voice call. For another example, the electronic device 201 may be configured to make a voice over WiFi (VoWiFi) based voice call. For example, the electronic device 201 may make a packet based voice call using various modules. In the block diagram of FIG. 2, reference number 2200 may illustrate example software modules of the electronic device 201 for making a packet based voice call. For example, a bitrate controller (e.g., including various processing circuitry and/or executable program elements) 2201, a capturer (e.g., including various processing circuitry and/or executable program elements) 2202, a voice processor (e.g., including various processing circuitry and/or executable program elements) 2203, an encoder (e.g., including various processing circuitry and/or executable program elements) 2204, a voice activation detector (VAD) (e.g., including various processing circuitry and/or executable program elements) 2205, a packetizer (e.g., including various processing circuitry and/or executable program elements) 2206, and/or a transmitter (e.g., including various processing circuitry and/or executable program elements) 2207 may include a software module generated by one or more instructions stored in the memory 230 executed by the processor 220 (e.g., processing circuitry and/or executable program elements).

According to an embodiment, the processor 220 of the electronic device 201 may include various processing circuitry and encode a sound signal received by the sound receiving circuit 240 upon making a packet based call, using a codec (e.g., compressor/decompressor). For example, the processor 220 may encode a sound signal at a first bitrate. According to an embodiment, the electronic device 201 may be configured to transmit a packet at a predetermined time interval upon making a packet based call. The processor 220 may encode a sound signal in units of a length corresponding to the predetermined time interval. For example, the processor 220 may transmit a packet including the encoded sound signal to the external electronic device 204, based on a real-time transport protocol (RTP).

For example, the capturer 2202 may include various processing circuitry and/or program elements and receive a sound signal, using the sound receiving circuit 240. The capturer 2202 may deliver the received sound signal to the voice processor 2203. For example, the voice processor 2203 may include various processing circuitry and/or program elements and process the received sound signal. The voice processor 2203 may perform echo cancelling and/or noise suppression on the sound signal.

The voice processor 2203 may deliver the processed sound signal to the encoder 2204. The encoder 2204 may include various processing circuitry and/or program elements and determine whether a voice is included in the sound signal, using the VAD 2205. For example, when a voice signal is included in the sound signal, the encoder 2204 may encode the sound signal at a specified bitrate in response to the control signal of the bitrate controller 2201. The encoder 2204 may deliver the encoded sound signal to the packetizer 2206. For another example, when the voice signal is not included in the sound signal, the encoder 2204 may transmit, to the packetizer 2206, predetermined data indicating that the voice signal is not included.

The packetizer 2206 may include various processing circuitry and/or program elements and generate a packet from the data received from the encoder 2204. For example, the packetizer 2206 may add a header to the encoded sound signal to generate at least one packet. The packetizer 2206 may deliver the generated packet to the transmitter 2207. The transmitter 2207 may transmit the packet to the second network 199, using the communication circuit 290.

In the communication requiring real-time packet transmission and reception such as a packet based call, the electronic device 201 may transmit a packet to the external electronic device 204 at specified time intervals. The external electronic device 204 may determine whether an error occurs in a packet, based on an error check (e.g., checksum) for the received packet. Even when the number of error bits included in the packet is relatively small, the external electronic device 204 may discard the faulty packet.

According to an embodiment, in the communication situation (e.g., weak electric fields) with a high error rate, the electronic device 201 may reduce the size of the packet. The probability that the packet includes an error bit decreases depending on the reduction of the size of the packet, and thus the electronic device 201 may reduce the probability that the packet is to be discarded, by reducing the size of the packet. The packet is transmitted at specified time intervals, and thus the processor 220 may reduce the size of the packet by reducing the bitrate for encoding the sound signal.

According to an embodiment, the processor 220 may determine the change in the bitrate for encoding a sound signal, based on the communication environment of the electronic device 201. For example, the processor 220 may change the bitrate of the encoder 2204 in real time, using the bitrate controller 2201. The bitrate controller 2201 may obtain encoded frame size information from the encoder 2204 and may control the bitrate of the encoder 2204 as described in greater detail below. For example, when the communication environment of the electronic device 201 is worsened below a first threshold value, the processor 220 (e.g., the bitrate controller 2201) may determine the reduction in the bitrate. For another example, when the communication environment of the electronic device 201 is improved above a second threshold value (e.g., the second threshold value is not less than the first threshold value), the processor 220 (e.g., the bitrate controller 2201) may determine the increase in a bitrate.

According to an embodiment, the processor 220 may identify the communication environment based on a network environment between the electronic device 201 and the base station 202. The electronic device 201 may identify the communication environment, based, for example, and without limitation, on signal strength, uplink resource information, an error rate, the amount of downlink data packets, or the like. For example, the processor 220 may identify the communication environment based on the signal strength of the signal (e.g., a reference signal) received from the base station 202. In this case, when the strength of the received signal is less than the threshold strength, the electronic device 201 may determine the reduction in the bitrate. For another example, the processor 220 may identify the communication environment, using the uplink resource information (e.g., uplink grant) received from the base station 202. In this case, when the uplink resource block allocated by the base station 202 is less than a threshold value, the processor 220 may determine the reduction in the bitrate. For another example, the processor 220 may identify the communication environment based on the error rate (e.g., a downlink error rate and/or an uplink error rate). In this case, when the error rate is not less than a threshold error rate, the processor 220 may determine the reduction in the bitrate. For another example, the processor 220 may identify the communication environment based on the amount of downlink data packets received from the base station 202. In this case, when the amount of the downlink data packets is less than a threshold value, the processor 220 may determine the reduction in the bitrate. According to various embodiments, when one or a plurality of conditions among the above-described various conditions are satisfied, the processor 220 may determine the reduction in the bitrate.

According to an embodiment, the processor 220 may identify the communication environment based on the network environment between the electronic device 201 and the external electronic device 204. The processor 220 may identify the communication environment based on the message received from the external electronic device 204. For example, the processor 220 may identify the communication environment, based on a real-time transport control protocol (RTCP) using the message received from the external electronic device 204. For example, the message received from the external electronic device 204 may include delay information (e.g., round trip time), a packet loss rate, and/or jitter. When the delay exceeds a threshold time, when the packet loss rate exceeds a threshold loss rate, and/or when the jitter exceeds a threshold value, the processor 220 may determine the reduction in the bitrate.

For example, the network environment between the electronic device 201 and the base station 202 may be referred to as a short term parameter; the network environment between the electronic device 201 and the external electronic device 204 may be referred to as a long term parameter. According to an embodiment, the processor 220 may identify the communication environment based on the short term parameter and the long term parameter. For example, when the short term parameter-based communication environment corresponds to the change in the bitrate, the processor 220 may determine the change in the bitrate further with reference to the long term parameter. In this case, even though the short term parameter indicates a relatively bad communication environment, the processor 220 may not change the bitrate as long as the long term parameter indicates a relatively good communication environment. However, various embodiments of the disclosure are not limited thereto. Even though the long term parameter indicates a relatively good communication environment, the processor 220 may change the bitrate when the short term parameter indicates a relatively bad communication environment. For another example, when the long term parameter-based communication environment corresponds to the change in the bitrate, the processor 220 may determine the change in the bitrate further with reference to the short term parameter. In this case, even though the long term parameter indicates a relatively bad communication environment, the processor 220 may not change the bitrate as long as the short term parameter indicates a relatively good communication environment. However, various embodiments of the disclosure are not limited thereto. Even though the short term parameter indicates a relatively good communication environment, the processor 220 may change the bitrate when the long term parameter indicates a relatively bad communication environment. According to an embodiment, the processor 220 may identify the communication environment based on the short term parameter and/or the long term parameter. For example, when the communication environment based on the short term parameter and/or the long term parameter corresponds to the change in the bitrate, the processor 220 may determine the change in the bitrate.

According to various embodiments, when the change in the bitrate is determined, the processor 220 may change the bitrate based on whether a voice signal is received. For example, the processor 220 may change the bitrate in a silent section where the voice signal is not received. The electronic device 201 may reduce the sound error due to the change in the bitrate by changing the bitrate in the silent section.

According to an embodiment, the processor 220 may identify the silent section based on the type and/or size of the packet of the encoded sound signal. For example, the processor 220 may encode a sound signal of a length of a predetermined time section. In this case, when the sound signal includes a voice signal within the corresponding time section, the processor 220 may encode a sound signal to generate a first packet. When the sound signal does not include the voice signal within the corresponding time section, the processor 220 may generate a second packet. According to an embodiment, the types of the first packet and the second packet may be different from each other. The second packet may include an indicator indicating the packet corresponding to the silent section. According to an embodiment, the second packet may have a smaller size than the first packet. For example, the processor 220 may generate a predetermined packet indicating a silent section as a second packet, instead of encoding the sound signal. According to an embodiment, when the packet encoded by the codec corresponds to the type and/or size of the second packet, the processor 220 may identify the packet as the silent section.

According to an embodiment, the processor 220 may identify the silent section, using voice activity detection (VAD). For example, when the corresponding section is indicated as the silent section by the VAD function of codec, the processor 220 may change the bitrate.

According to an embodiment, when the change in the bitrate is determined, the processor 220 may change the bitrate based on a timer and whether a voice signal is received. For example, when the change in the bitrate is determined, the processor 220 may set the timer. When the silent section is not identified until the timer expires, the processor 220 may change the bitrate when the timer expires.

According to an embodiment, the processor 220 may set the time of the timer, based on the communication environment or the bitrate to be changed. For example, as the communication environment is worsened, the processor 220 may set the time of the timer to be shorter. For another example, as the bitrate to be changed is lower, the processor 220 may set the time of the timer to be shorter. According to another embodiment, the processor 220 may set the time of the timer depending on a value stored in the memory 230.

According to an embodiment, when the silent section is identified or when the timer expires, the processor 220 may identify the communication environment of the electronic device 201. For example, after the change in the bitrate is determined, when the silent section occurs, or when the timer expires, the processor 220 may identify the communication environment to determine whether the change in the bitrate is still necessary. For example, in the case where the communication environment is improved and thus the change in the bitrate is not necessary when the silent section occurs or when the timer expires, the processor 220 may maintain the bitrate without performing the change in the bitrate.

Figure 3:
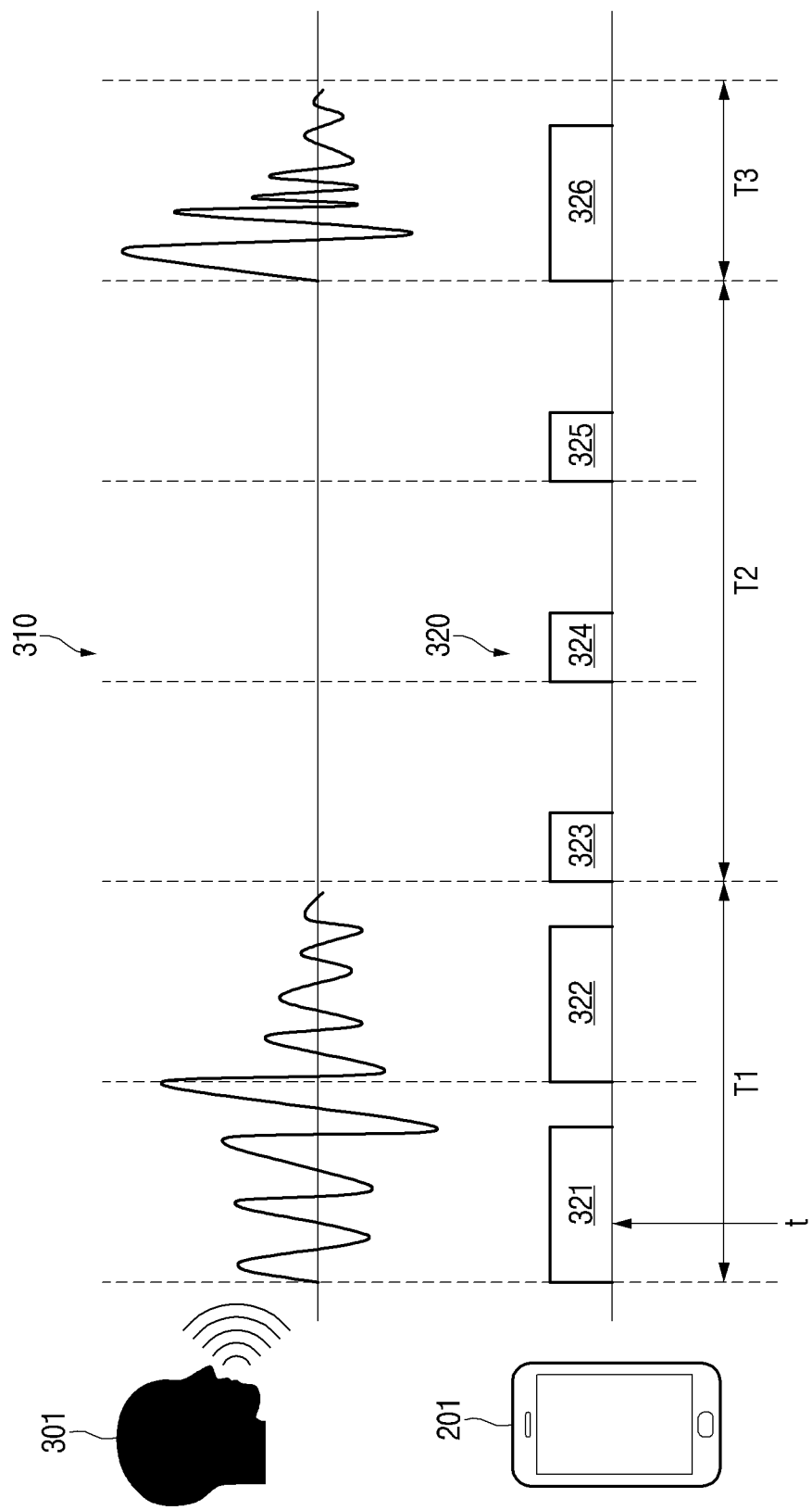
FIG. 3 is a diagram illustrating an example silent section for changing a bitrate according to an embodiment.

FIG. 3 is a diagram illustrating an example silent section for changing a bitrate according to an embodiment.

Referring to FIG. 3, a first graph 310 illustrates an example sound signal received by the electronic device 201 due to the utterance of a user 301; a second graph 320 illustrates a example packet in which the received sound signal is encoded.

In the non-limiting example of FIG. 3, for example, at time 't', the electronic device 201 may determine a change in a bitrate based on a communication environment. In time section T1, for example, the electronic device 201 may generate a first packet 321 and a second packet 322 by encoding the received sound signal. For example, the electronic device 201 may encode a sound signal at a first bitrate. Because the change in the bitrate is determined at time T but a voice is continuously received in time section T1, the electronic device 201 may generate the first packet 321 and the second packet 322 by encoding the sound signal at the first bitrate without changing the bitrate.

Because the sound signal including the voice is not received in time section T2, the electronic device 201 may generate a third packet 323, a fourth packet 324, and a fifth packet 325 indicating that the corresponding section is the silent section. The electronic device 201 may change the bitrate of codec from the first bitrate to the second bitrate in response to the identification of the silent section. For example, the electronic device 201 may change the bitrate at an arbitrary point in time section T2.

In time section T3, the electronic device 201 may receive the voice signal again. The electronic device 201 may generate a sixth packet 326 by encoding the received voice signal at the changed second bitrate. For example, when the second bitrate is lower than the first bitrate, the size of the sixth packet 326 may be smaller than the first packet 321.

Figure 4:
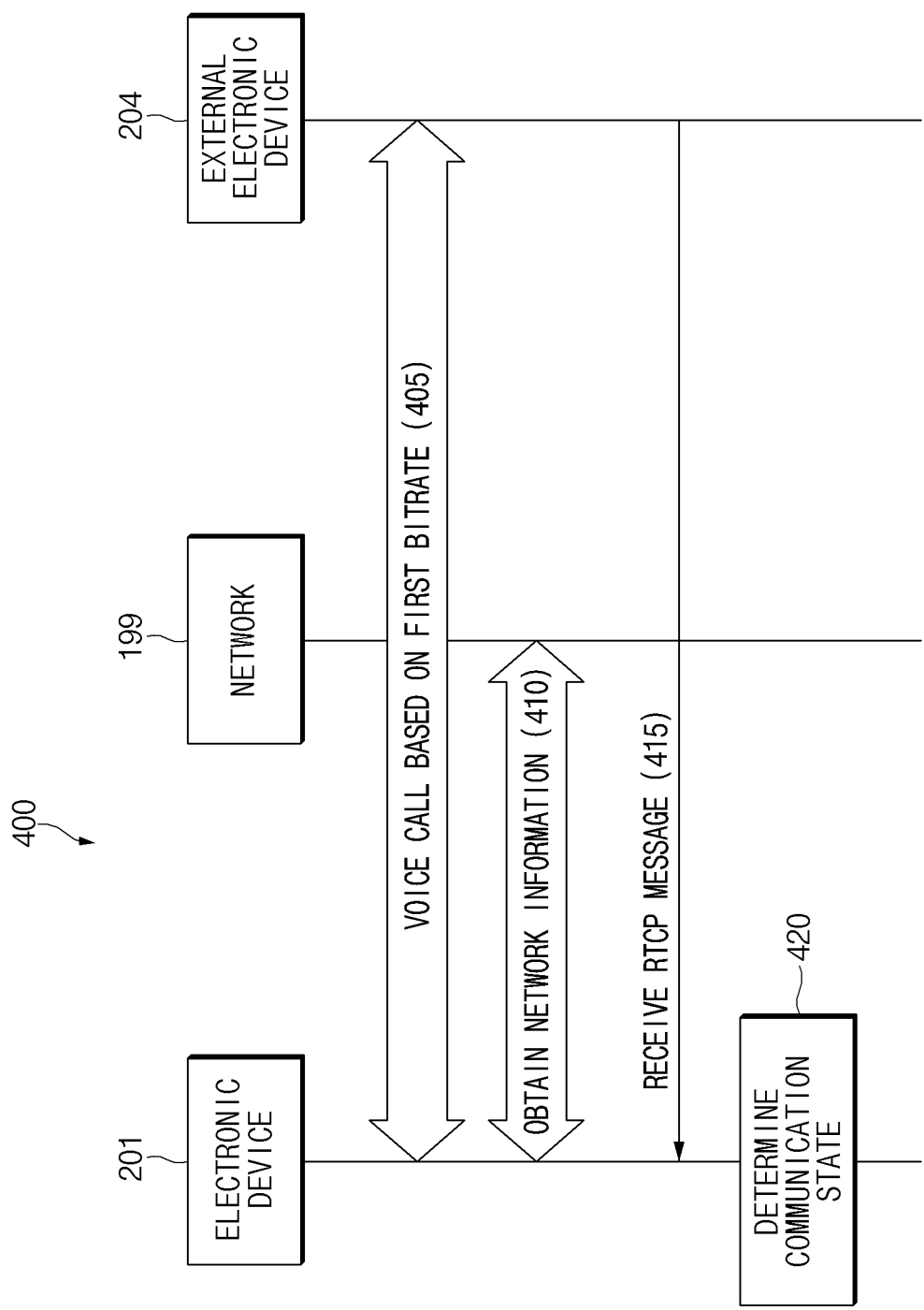
FIG. 4 is a signal flowchart illustrating an example method of obtaining a network state, according to an embodiment.

FIG. 4 is a signal flowchart 400 illustrating an example method of obtaining a network state, according to an embodiment.

According to various embodiments, in operation 405, the electronic device 201 may make a voice call with the external electronic device 204 based on a first bitrate. For example, the electronic device 201 may make a packet based voice call with the external electronic device 204. For example, the electronic device 201 may encode the voice signal received by the electronic device 201 at the first bitrate and may transmit the encoded data to the external electronic device 204 at specified time intervals.

According to various embodiments, in operation 410, the electronic device 201 may obtain network information from the network 199. For example, the network information may include, for example, and without limitation, uplink resource information, an error rate (e.g., block error rate), and/or reception signal strength, or the like. For example, the electronic device 201 may include the uplink resource information by receiving control information including the uplink resource information from the network 199. The uplink resource information may include information about the number of uplink resources (e.g., the number of resource blocks) allocated to the electronic device 201. For example, the electronic device 201 may obtain the error rate based on feedback information received from the network 199. The electronic device 201 may identify the error rate of uplink data based on information of acknowledgment (ACK)/negative ACK (HACK) or the retransmission request received from the network 199. For example, the electronic device 201 may obtain the error rate based on the data received from the network 199. The electronic device 201 may identify the error rate of downlink data based on the decoding success rate of the downlink data received from the network 199. For example, the electronic device 201 may obtain information about the reception signal strength by measuring the reception strength of the signal received from the network 199.

According to various embodiments, in operation 415, the electronic device 201 may receive an RTCP message from the external electronic device 204. For example, the RTCP message may include, for example, and without limitation, information about delay, a packet loss rate, and/or jitter, or the like.

According to various embodiments, in operation 420, the electronic device 201 may determine the communication state of the electronic device 201, based, for example, on the obtained network information and/or the RTCP message. As described above, the electronic device 201 may determine whether to change the first bitrate, based on the determined communication state. Based on the change in the first bitrate being determined, the electronic device 201 may change the first bitrate to a second bitrate based at least partly on whether the voice is received.

The order of operation 410, operation 415, and operation 420 illustrated in FIG. 4 is an example, and embodiments of the disclosure are not limited thereto. For example, the electronic device 201 may obtain network information (e.g., operation 410) and then may determine the communication state (e.g., operation 420). For another example, the electronic device 201 may perform operation 415 before operation 410. For another example, operation 410 or operation 415 may be omitted.

Figure 5:
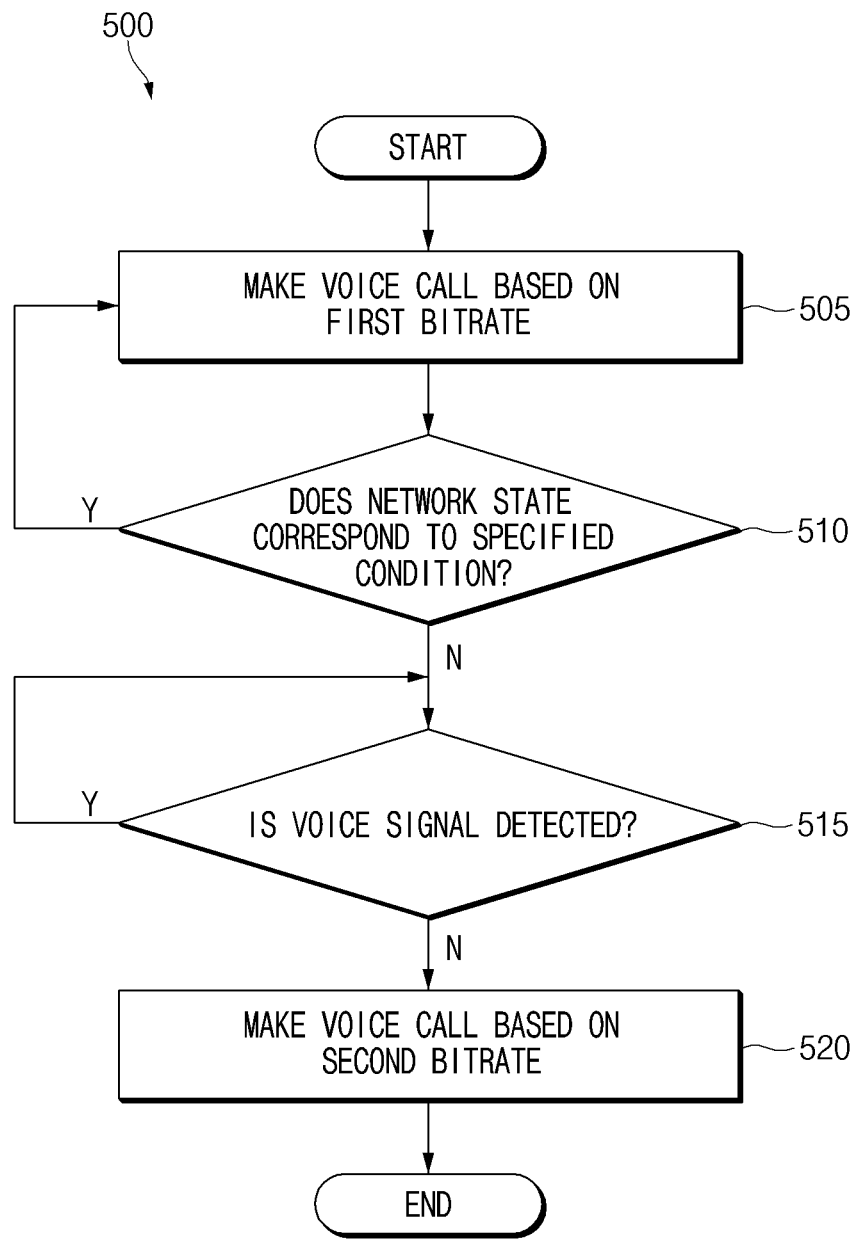
FIG. 5 is a flowchart illustrating an example method of changing a bitrate, according to an embodiment.

FIG. 5 is a flowchart 500 illustrating an example method of changing a bitrate, according to an embodiment.

According to various embodiments, in operation 505, the processor (e.g., the processor 220 of FIG. 2) of an electronic device (e.g., the electronic device 201 of FIG. 1) may make a voice call based on a first bitrate. For example, the processor may make a packet based voice call (e.g., VoLTE or VoWiFi) with an external electronic device (e.g., the external electronic device 204 of FIG. 2), using a communication circuit (e.g., the communication circuit 290 of FIG. 2). The processor may receive a sound signal, using a sound receiving circuit (e.g., the sound receiving circuit 240 of FIG. 2) and may encode the sound signal at the first bitrate, using codec.

According to various embodiments, in operation 510, the processor may determine whether the network state corresponds to the specified condition. For example, the specified condition may include, for example, and without limitation, the case where the number of uplink resource blocks allocated to the electronic device is not less than a first threshold value, the case where an error rate (e.g., a downlink error rate and/or an uplink error rate) is less than a threshold error rate, the case where the amount of downlink data packets is not less than a second threshold value, the case where the delay between the electronic device and an external electronic device is not greater than a threshold time, the case where the packet loss rate is not greater than a threshold loss rate, and/or the case where jitter is not greater than a third threshold value, etc. When the network state corresponds to the specified condition, the processor may maintain the first bitrate.

When the network state does not correspond to the specified condition ("No" in operation 510), in operation 515, the processor may determine whether a voice signal is detected. For example, the processor may identify the silent section based, for example, and without limitation, on VAD, the type of the encoded packet, and/or the size of the encoded packet, or the like. The processor may identify whether the voice signal is included in the sound signal, using the VAD function of codec. When the encoded packet is in the packet type indicating the silent section, the processor may identify the silent section. When the size of the encoded packet corresponds to the predetermined size (e.g., less than the predetermined size), the processor may determine that the corresponding packet does not include a voice signal. When the voice signal is detected, the processor may continuously monitor whether the voice signal is detected.

When the voice signal is not detected ("No" in operation 515), in operation 520, the processor may make a voice call based on the second bitrate. For example, the processor may encode a sound signal at a second bitrate, using codec. Before changing the bitrate, the processor may again determine whether the network state corresponds to the specified condition (e.g., operation 510).

Figure 6:
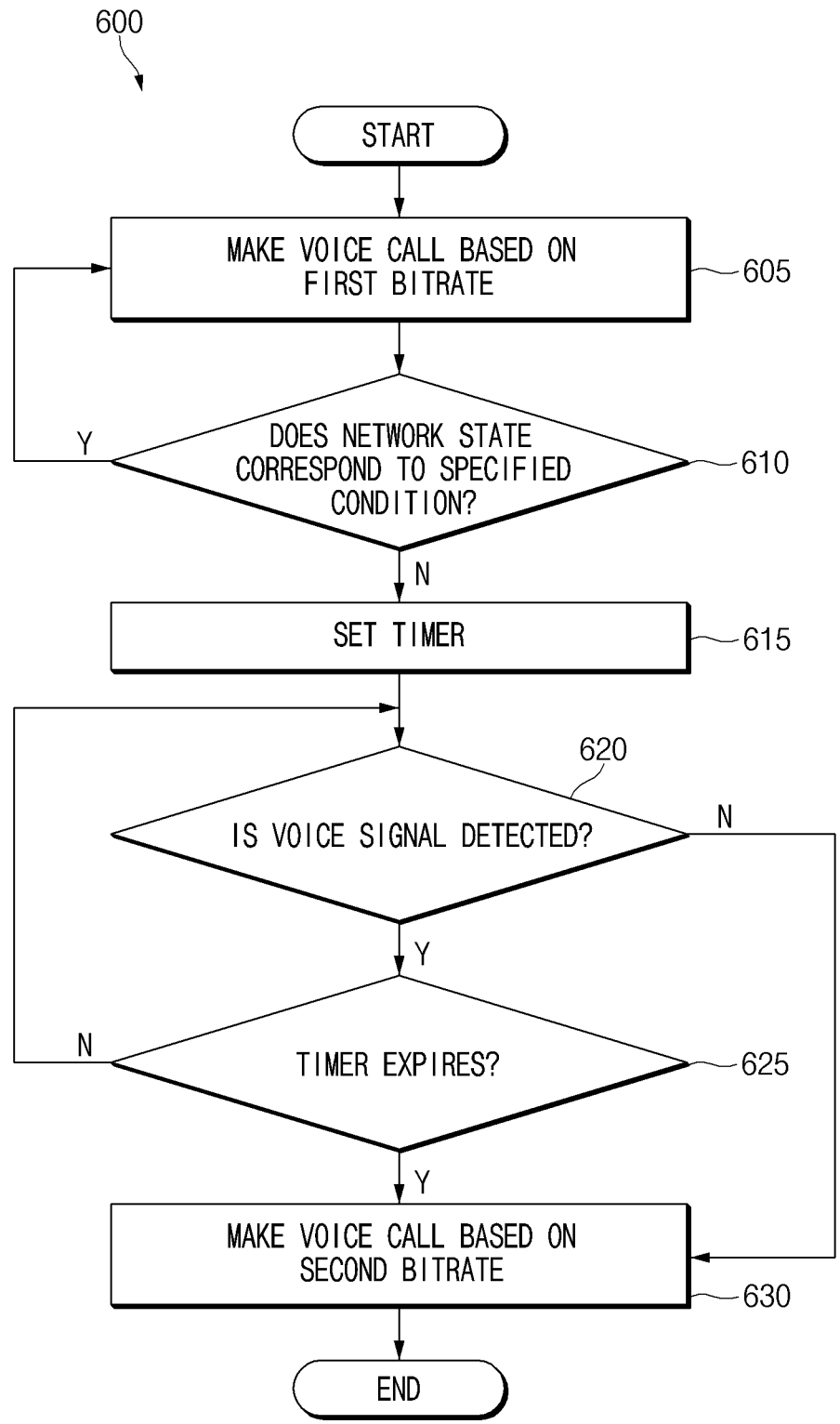
FIG. 6 is a flowchart illustrating an example method of changing a bitrate, according to an embodiment.

FIG. 6 is a flowchart 600 illustrating an example method of changing a bitrate, according to an embodiment.

According to various embodiments, in operation 605, the processor (e.g., the processor 220 of FIG. 2) of an electronic device (e.g., the electronic device 201 of FIG. 1) may make a voice call based on a first bitrate. The description of operation 605 may be referenced by the description associated with operation 505 of FIG. 5.

According to various embodiments, in operation 610, the processor may determine whether the network state corresponds to the specified condition. The description of operation 610 may be referenced by the description associated with operation 510 of FIG. 5.

When the network state does not correspond to the specified condition ("No" in operation 610), in operation 615, the processor may set a timer. For example, the processor may set the length of the timer based on a communication state and/or a second bitrate. For another example, the processor may set a timer of a predetermined length.

According to various embodiments, in operation 620, the processor may determine whether a voice signal is detected. The description of operation 620 may be referenced by the description associated with operation 515 of FIG. 5.

When the voice signal is not detected ("No" in operation 620), the processor may perform operation 630. When the voice signal is detected ("Yes" in operation 620), in operation 625, the processor may determine whether a timer expires. When the timer does not expire ("No" in operation 625), the processor may continuously monitor whether the voice signal is detected and whether the timer expires. When the timer expires even though the voice signal is detected ("Yes" in operation 625), the processor may perform operation 630.

When the voice signal is not detected ("No" in operation 620) or when the timer expires ("Yes" in operation 625), in operation 630, the processor may make a voice call based on the second bitrate. The description of operation 630 may be referenced by the description associated with operation 520 of FIG. 5.

According to various example embodiments, an electronic device (e.g., the electronic device 201 of FIG. 2) may include a sound receiving circuit (e.g., the sound receiving circuit 240 of FIG. 2), a communication circuit (e.g., the communication circuit 290 of FIG. 2), a processor (e.g., the processor 220 of FIG. 2) operatively connected to the sound receiving circuit and the communication circuit, and a memory (e.g., the memory 230 of FIG. 2) operatively connected to the processor. The memory may store one or more instructions that, when executed, cause the processor to control the electronic device to perform operations to be described later.

According to an example embodiment, the processor may make a packet based call with an external electronic device using the communication circuit, may obtain communication environment information of the electronic device using the communication circuit, may determine a change in a bitrate of the packet based call based on the obtained communication environment information, may identify whether a voice is received through the sound receiving circuit in response to the determination of the change in the bitrate, and may change the bitrate of the packet based call from a first bitrate to a second bitrate based on a silent section in which the voice is not received through the sound receiving circuit being identified.

According to an example embodiment, the processor may encode a sound signal received through the sound receiving circuit into at least one packet and may identify the silent section based on a type or a size of the at least one packet.

According to an example embodiment, the processor may encode a sound signal received through the sound receiving circuit into at least one packet using a codec and may identify the silent section using voice activity detection of the codec.

According to an example embodiment, the processor may determine the change in the bitrate based on at least one of an error rate of an uplink signal or an error rate of a downlink signal being not less than a specified first threshold value.

According to an example embodiment, the processor may determine the change in the bitrate based on at least one of reception strength of a signal received from a base station, uplink resource information, or downlink resource information.

According to an example embodiment, the processor may obtain reception quality information of the external electronic device for a transmission signal of the electronic device from the external electronic device using the communication circuit and may determine the change in the bitrate based on the obtained reception quality information.

According to an example embodiment, the processor may set a timer of a first time length in response to the determination of the change in the bitrate and may change the bitrate of the packet based call from the first bitrate to the second bitrate when the timer expires based on the silent section not being identified until the timer expires.

According to an example embodiment, the processor may set the first time length of based on the communication environment information.

According to an example embodiment, the processor may encode a sound signal obtained through the sound receiving circuit at the first bitrate by a predetermined time section length before the change in the bitrate of the packet based call and may encode the sound signal obtained through the sound receiving circuit at the second bitrate by the predetermined time section length after the change in the bitrate of the packet based call.

According to various example embodiments, a method for changing a bitrate during a voice call of an electronic device may include making a packet based call with an external electronic device, obtaining communication environment information of the electronic device, determining a change in a bitrate of the packet based call based on the obtained communication environment information, identifying whether a voice is received in response to the determination of the change in the bitrate, and changing the bitrate of the packet based call from a first bitrate to a second bitrate based on a silent section in which the voice is not received being identified.

According to an example embodiment, the identifying of whether the voice is received may include encoding the received sound signal into at least one packet and identifying the silent section based on a type or a size of the at least one packet.

According to an example embodiment, the identifying of whether the voice is received may include encoding the received sound signal into at least one packet using a codec and identifying the silent section using voice activity detection of the codec.

According to an example embodiment, the determining of the change in the bitrate may include determining the change in the bitrate based on at least one of an error rate of an uplink signal or an error rate of a downlink signal being not less than a specified first threshold value.

According to an example embodiment, the determining of the change in the bitrate may include determining the change in the bitrate based on at least one of reception strength of a signal received from a base station, uplink resource information, or downlink resource information.

According to an example embodiment, the determining of the change in the bitrate may include obtaining reception quality information of the external electronic device for a transmission signal of the electronic device from the external electronic device and determining the change in the bitrate based on the obtained reception quality information.

According to an example embodiment, the method may further include setting a timer of a first time length in response to the determination of the change in the bitrate and changing the bitrate of the packet based call from the first bitrate to the second bitrate when the timer expires based on the silent section not being identified until the timer expires.

According to an example embodiment, the method may further include setting the first time length of based on the communication environment information.

According to an example embodiment, the method may further include encoding a obtained sound signal at the first bitrate by a predetermined time section length before the change in the bitrate of the packet based call and encoding the obtained sound signal at the second bitrate by the predetermined time section length after the change in the bitrate of the packet based call.

According to various example embodiments, an electronic device (e.g., the electronic device 201 of FIG. 2) may include a sound receiving circuit (e.g., the sound receiving circuit 240 of FIG. 2), a communication circuit (e.g., the communication circuit 290 of FIG. 2), a processor (e.g., the processor 220 of FIG. 2) operatively connected to the sound receiving circuit and the communication circuit, and a memory (e.g., the memory 230 of FIG. 2) operatively connected to the processor. The memory may store one or more instructions that, when executed, cause the processor to control the electronic device to perform operations to be described later.

According to an example embodiment, the electronic device makes a packet based call with an external electronic device using the communication circuit, and the electronic device may encode a sound signal received using the sound receiving circuit using a codec at a first bitrate to transmit the encoded sound signal to the external electronic device at a first period, may obtain communication environment information of the electronic device using the communication circuit, may determine a change in a bitrate of the packet based call based on the obtained communication environment information, may identify at least one silent section among a plurality of sound signal sections received through the sound receiving circuit and divided into units of the first period in response to the determination of the change in the bitrate, and may change the bitrate of the packet based call from the first bitrate to a second bitrate in the identified at least one silent section.

According to an example embodiment, the electronic device may identify the silent section based on at least one of a voice activity detection function of the codec, a type of a packet including a sound signal encoded using the codec, or a size of the packet.

According to various example embodiments of the disclosure, an electronic device may prevent and/or reduce the deterioration of communication quality by adaptively controlling codec based on a voice reception state.

The electronic device may make a VoIP call using the codec corresponding to the set codec parameter. As the situation of the electric field of the electronic device is changed, the electronic device may change the bitrate of the codec. For example, the electronic device may reduce the bitrate as the situation of the electric field is worsened, thereby preventing and/or reducing the loss of a packet. For another example, the electronic device may improve the sound quality of a voice by increasing the bitrate as the situation of the electric field is improved.

While the disclosure has been illustrated and described with reference to various example embodiments thereof, it will be understood by those skilled in the art that the various example embodiments are intended to be illustrative, not limiting, and that various changes in form and details may be made therein without departing from the spirit and scope of the disclosure including, for example, the appended claims and their equivalents.

What is claimed is:

1. An electronic device comprising:
   a sound receiving circuit;
   a communication circuit;
   a processor operatively connected to the sound receiving circuit and the communication circuit; and
   a memory operatively connected to the processor,
   wherein the memory stores one or more instructions that, when executed, cause the processor to control the electronic device to:
   make a packet based call to an external electronic device using the communication circuit;
   obtain communication environment information of the electronic device using the communication circuit;
   determine a change in a bitrate of the packet based call based on the obtained communication environment information;
   identify whether a voice is received through the sound receiving circuit in response to the determination of the change in the bitrate;

set a timer to a first time length in response to the determination of the change in the bitrate;

change the bitrate of the packet based call from a first bitrate to a second bitrate in response to a detection of a silent section in which the voice is not received through the sound receiving circuit while the timer is running during the first time length; and change the bitrate of the packet based call from the first bitrate to the second bitrate in response to an expiration of the timer without detecting the silent section.

2. The electronic device of claim 1, wherein the one or more instructions, when executed, cause the processor to control the electronic device to:

encode a sound signal received through the sound receiving circuit into at least one packet; and identify the silent section based on a type or a size of the at least one packet.

3. The electronic device of claim 1, wherein the one or more instructions, when executed, cause the processor to control the electronic device to:

encode a sound signal received through the sound receiving circuit into at least one packet using a codec; and identify the silent section using voice activity detection of the codec.

4. The electronic device of claim 1, wherein the one or more instructions, when executed, cause the processor to control the electronic device to:

determine the change in the bitrate based on at least one of an error rate of an uplink signal or an error rate of a downlink signal being not less than a specified first threshold value.

5. The electronic device of claim 1, wherein the one or more instructions, when executed, cause the processor to control the electronic device to:

determine the change in the bitrate based on at least one of reception strength of a signal received from a base station, uplink resource information, or downlink resource information.

6. The electronic device of claim 1, wherein the one or more instructions, when executed, cause the processor to control the electronic device to:

obtain reception quality information of the external electronic device for a transmission signal of the electronic device from the external electronic device using the communication circuit; and determine the change in the bitrate based on the obtained reception quality information.

7. The electronic device of claim 1, wherein the one or more instructions, when executed, cause the processor to control the electronic device to:

encode a sound signal obtained through the sound receiving circuit, at the first bitrate by a predetermined time section length before the change in the bitrate of the packet based call; and encode the sound signal obtained through the sound receiving circuit at the second bitrate by the predetermined time section length after the change in the bitrate of the packet based call.

8. The electronic device of claim 1, wherein the first time length of the timer is set based on the second bitrate or the communication environment information.

9. A method for changing a bitrate during a voice call of an electronic device, the method comprising:

making a packet based call to an external electronic device;

obtaining communication environment information of the electronic device;

determining a change in a bitrate of the packet based call based on the obtained communication environment information;

identifying whether a voice is received in response to the determination of the change in the bitrate;

setting a timer to a first time length in response to the determination of the change in the bitrate;

changing the bitrate of the packet based call from a first bitrate to a second bitrate in response to a detection of a silent section in which the voice is not received while the timer is running during the first time length; and changing the bitrate of the packet based call from the first bitrate to the second bitrate in response to an expiration of the timer without detecting the silent section.

10. The method of claim 9, wherein the identifying of whether the voice is received includes:

encoding received sound signal into at least one packet; and identifying the silent section based on a type or a size of the at least one packet.

11. The method of claim 9, wherein the identifying of whether the voice is received includes:

encoding received sound signal into at least one packet using a codec; and identifying the silent section using voice activity detection of the codec.

12. The method of claim 9, wherein the determining of the change in the bitrate includes:

determining the change in the bitrate based on at least one of an error rate of an uplink signal or an error rate of a downlink signal being not less than a specified first threshold value.

13. The method of claim 9, wherein the determining of the change in the bitrate includes:

determining the change in the bitrate based on at least one of reception strength of a signal received from a base station, uplink resource information, or downlink resource information.

14. The method of claim 9, wherein the determining of the change in the bitrate includes:

obtaining reception quality information of the external electronic device for a transmission signal of the electronic device from the external electronic device; and determining the change in the bitrate based on the obtained reception quality information.

15. The method of claim 9, further comprising:

encoding an obtained sound signal at the first bitrate by a predetermined time section length before the change in the bitrate of the packet based call; and encoding the obtained sound signal at the second bitrate by the predetermined time section length after the change in the bitrate of the packet based call.

16. An electronic device comprising:

a sound receiving circuit;

a communication circuit;

a processor operatively connected to the sound receiving circuit and the communication circuit; and a memory operatively connected to the processor, wherein, the electronic device is configured to make a packet based call with an external electronic device using the communication circuit, and the memory stores one or more instructions that, when executed, cause the processor to control the electronic device to:

encode a sound signal received using the sound receiving circuit using a codec at a first bitrate to transmit the encoded sound signal to the external electronic device at a first period;

obtain communication environment information of the electronic device using the communication circuit;

determine a change in a bitrate of the packet based call based on the obtained communication environment information;

set a timer to a first time length in response to the determination of the change in the bitrate;

identify whether at least one silent section among a plurality of sound signal sections divided into units of the first period is received through the sound receiving circuit in response to the determination of the change in the bitrate; and change the bitrate of the packet based call from the first bitrate to a second bitrate in response to the identification of the at least one silent section while the timer is running during the first time length; and change the bitrate of the packet based call from the first bitrate to the second bitrate in response to an expiration of the timer without identifying the silent section.

17. The electronic device of claim 16, wherein the one or more instructions, when executed, cause the processor to control the electronic device to:

identify the silent section based on at least one of a voice activity detection function of the codec, a type of a packet including a sound signal encoded using the codec, or a size of the packet.

* * * * *